(12) United States Patent
Bonde et al.

(10) Patent No.: US 6,316,570 B1
(45) Date of Patent: Nov. 13, 2001

(54) POLYMERIZABLE COMPOSITION OF ALIPHATIC POLYOL (ALLYL CARBONATE)

(75) Inventors: Craig J. Bonde, Largo, FL (US); Diane M. Tracy, Baden; Charles C. Clontz, Coraopolis, both of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/339,393

(22) Filed: Jun. 23, 1999

(51) Int. Cl.$^7$ .................................................... C08F 18/24
(52) U.S. Cl. .......................... 526/314; 526/204; 526/217; 526/220; 526/230.5
(58) Field of Search .................................. 526/204, 217, 526/220, 230.5, 314

(56) References Cited

U.S. PATENT DOCUMENTS

| | | | |
|---|---|---|---|
| 2,370,567 | 2/1945 | Muskat et al. | 260/463 |
| 2,403,113 | 7/1946 | Muskat et al. | 260/78 |
| 3,361,706 | 1/1968 | Meriwether et al. | 260/39 |
| 3,562,172 | 2/1971 | Ono et al. | 252/300 |
| 3,567,605 | 3/1971 | Becker | 204/158 |
| 3,578,602 | 5/1971 | Ono et al. | 252/300 |
| 4,166,043 | 8/1979 | Uhlmann et al. | 252/300 |
| 4,215,010 | 7/1980 | Hovey et al. | 252/300 |
| 4,342,668 | 8/1982 | Hovey et al. | 252/586 |
| 4,367,170 | 1/1983 | Uhlmann et al. | 252/586 |
| 4,613,656 | 9/1986 | Tang | 526/193 |
| 4,622,376 * | 11/1986 | Misura et al. | 526/286 |
| 4,637,698 | 1/1987 | Kwak et al. | 351/163 |
| 4,643,537 | 2/1987 | Vance | 350/438 |
| 4,650,605 | 3/1987 | Vance | 252/589 |
| 4,666,976 | 5/1987 | Misura | 524/739 |
| 4,740,070 | 4/1988 | Vance | 351/163 |
| 4,816,584 | 3/1989 | Kwak et al. | 344/71 |
| 4,818,096 | 4/1989 | Heller et al. | 351/163 |
| 4,826,977 | 5/1989 | Heller et al. | 544/70 |
| 4,880,667 | 11/1989 | Welch | 427/160 |
| 4,931,219 | 6/1990 | Kwiatkowski et al. | 252/586 |
| 4,931,220 | 6/1990 | Haynes et al. | 252/586 |
| 5,017,666 | 5/1991 | Crano et al. | 526/230.5 |
| 5,066,818 | 11/1991 | Van Gemert et al. | 549/389 |
| 5,084,526 | 1/1992 | Crano | 525/455 |
| 5,110,881 | 5/1992 | McBain et al. | 525/455 |
| 5,221,721 | 6/1993 | Selvig | 526/193 |
| 5,236,978 | 8/1993 | Selvig et al. | 524/81 |
| 5,246,630 | 9/1993 | Selvig | 252/586 |
| 5,274,132 | 12/1993 | VanGemert | 549/389 |
| 5,384,077 | 1/1995 | Knowles | 252/586 |
| 5,405,958 | 4/1995 | VanGemert | 544/71 |
| 5,429,774 | 7/1995 | Kumar | 252/586 |
| 5,466,398 | 11/1995 | Van Gemert et al. | 252/586 |
| 5,599,876 | 2/1997 | Renzi et al. | 524/720 |
| 5,708,064 | 1/1998 | Coleman et al. | 524/90 |

FOREIGN PATENT DOCUMENTS

62/1953383    8/1987   (JP) .

OTHER PUBLICATIONS

*Techniques in Chemistry*, vol. III, "Photocromism," Chapter 3, Glenn H. Brown, Editor, John Wiley and Sons, Inc., New York, 1971.
American Standard Test Method No. D 542–95.
American Standard Test Method No. D 1003–95.

* cited by examiner

Primary Examiner—Helen L. Pezzuto
(74) Attorney, Agent, or Firm—Carol A. Marmo; James R. Franks

(57) ABSTRACT

Polymerizable compositions comprising a major amount of a first allyl functional monomer, which is an aliphatic polyol (allyl carbonate) monomer, e.g., diethylene glycol bis(allyl carbonate), and a minor amount of a second allyl functional monomer, which is an aromatic polyol (allyl carbonate) monomer, e.g., 4,4'-isopropylidenediphenol bis(allyl carbonate), are described. The second allyl functional monomer is present in the polymerizable composition of the present invention in at least an amount to provide a polymerizate of the composition having (i) reduced cracking relative to a polymerizate prepared from a comparative composition that is free of the second allyl functional monomer, and (ii) a refractive index of less than 1.530. Polymerizable compositions according to the present invention may optionally comprise static dyes and/or photochromic substances.

24 Claims, No Drawings

POLYMERIZABLE COMPOSITION OF ALIPHATIC POLYOL (ALLYL CARBONATE)

DESCRIPTION OF THE INVENTION

The present invention relates to polymerizable compositions and polymerizates prepared therefrom. Particularly, the present invention relates to polymerizable compositions that contain a major amount of a first component comprising an aliphatic polyol(allyl carbonate) monomer and a minor amount of a second component comprising an aromatic polyol(allyl carbonate) monomer. More particularly, the aromatic polyol(allyl carbonate) monomer is present in the compositions of the invention in at least amounts such that a polymerizate prepared from the composition has reduced cracking defects compared to polymerizates prepared only from the aliphatic polyol(allyl carbonate), and a refractive index of less than 1.530.

Polymerizable compositions based on polyol(allyl carbonate) monomers, particularly aliphatic polyol(allyl carbonate) monomers such as diethylene glycol bis(allyl carbonate), and polymerizates obtained therefrom are well known in the art. Polymerizates of polymerizable compositions based on diethylene glycol bis(allyl carbonate) possess excellent clarity, good flexibility, abrasion resistance and refractive index values of typically less than 1.530, e.g., 1.498.

Monomers such as diethylene glycol bis(allyl carbonate) are used extensively in the preparation of molded articles, such as ophthalmic lenses, noncorrective lenses, face shields, and automotive and aircraft transparencies. Molded ophthalmic lens articles are typically prepared by introducing a polymerizable composition into a mold, e.g., a glass mold, polymerizing the composition within the mold, and then removing the molded article from the mold. Polymerizable compositions based on aliphatic polyol(allyl carbonate), e.g., diethylene glycol bis(allyl carbonate), undergo shrinkage, i.e., a decrease in volume, upon polymerization. This decrease in volume can cause the polymerizing composition to pull away from the interior surfaces of the mold, thereby resulting in the formation of defects in the molded article. Defects due to volume shrinkage include, for example, cracking, warping and surface anomalies, and typically require scrapping of the defective article, resulting in increased production costs. Cracking is typically the most predominant defect attributed to volume shrinkage during in-mold polymerization or casting.

Polymerizates prepared from aliphatic polyol(allyl carbonate) monomers, such as diethylene glycol bis(allyl carbonate), are often tinted with static dyes and/or photochromic substances to form tinted polymerizates, e.g., sun lenses and tinted ophthalmic lenses. Typically, the process of tinting a polymerizate involves a multiple of steps. The polymerizate is first prepared in an undercured state, then tinted by a process of imbibition in which the colorant, e.g., one or more static dyes, is brought into contact with at least a portion of the surface of the undercured polymerizate. Finally, the tinted undercured polymerizate is fully cured. Such a multi-step tinting process takes additional time, increases the risk of damaging the polymerizate and ultimately can result in increased production costs. While adding the colorant to the polymerizable composition prior to polymerization (in what is commonly referred to as a tint-in-place process), could eliminate some of the aforedescribed process steps, the colorant is often destroyed or otherwise inactivated during the polymerization process.

It would be desirable to develop new aliphatic polyol (allyl carbonate) based polymerizable compositions that have reduced cracking defects, while retaining a refractive index less than 1.530. It would also be desirable that tinted polymerizates be preparable from such newly developed compositions.

U.S. Pat. No. 4,613,656 describes polymerizing a mixture of polyol(allyl carbonate) monomer and an adhesion reducing amount of monomer-compatible mold release agent in the presence of a monoperoxycarbonate initiator. The polyol (allyl carbonate) monomer of the '656 patent is described as being an allyl carbonate of linear or branched aliphatic or aromatic liquid polyols, e.g., aliphatic glycol bis(allyl carbonate) compounds or alkylidene bisphenol bis(allyl carbonate) compounds.

U.S. Pat. No. 4,666,976 describes a pourable, polymerizable composition of polyol(allyl carbonate) monomer, bromoxylenol blue and optionally a thermally decomposable polymerization initiator, e.g., a monoperoxycarbonate initiator. The polyol(allyl carbonate) monomer of the '976 patent is described as being an allyl carbonate of linear or branched aliphatic or aromatic liquid polyols, e.g., aliphatic glycol bis(allyl carbonate) compounds or alkylidene bisphenol bis(allyl carbonate) compounds.

In accordance with the present invention, there is provided a polymerizable composition comprising:

(a) a major amount of a first allyl functional monomer represented by the following general formula I,

in which $R_1$ is a polyvalent residue of an aliphatic polyol, $R_2$ is an allyl group or a substituted allyl group, and i is a whole number from 2 to 6; and (b) a minor amount of a second allyl functional monomer represented by the following general formula II,

in which $R_3$ is a polyvalent residue of an aromatic polyol, $R_4$ is an allyl group or a substituted allyl group and k is a whole number from 2 to 6, wherein said second allyl functional monomer is present in said polymerizable composition in at least an amount to provide a polymerizate of said polymerizable composition having (i) reduced cracking defects relative to a polymerizate of said composition free of (b), and (ii) a refractive index of less than 1.530, as determined in accordance with American Standard Test Method (ASTM) number D 542-95.

Other than in the operating examples, or where otherwise indicated, all numbers or expressions referring to quantities of ingredients, reaction conditions, etc. used in the specification and claims are to be understood as modified in all instances by the term "about."

DETAILED DESCRIPTION OF THE INVENTION

Polymerizates prepared from polymerizable compositions according to the present invention have reduced cracking defects. As used herein and in the claims, the term "cracking defects" and similar terms refer to cracks that are at least observable with the naked eye within and/or at the surface of a polymerizate, e.g., a molded article such as an ophthalmic lens.

The occurrence of cracking defects is a largely statistical phenomenon with polymerizates prepared from aliphatic polyol(allyl carbonate) monomers, such as diethylene glycol bis(allyl carbonate). Accordingly, in order to determine that a polymerizate prepared from a composition according to the present invention has "reduced cracking defects," more than one polymerizate, e.g., several lenses, is typically prepared. A set of comparative polymerizates is also prepared under similar conditions, e.g., using the same cure cycle, from a comparative composition containing the same first allyl functional monomer (a) and none of the second allyl functional material (b). The specific number of polymerizates that must be prepared is often determined by trial and error. In the case of plano lenses, typically between 10 and 100 lenses are cast to determine if the composition from which they were prepared provides reduced cracking defects. Such a determination is described in further detail in the Examples herein.

The polymerizable composition of the present invention contains first and second allyl functional monomers as described above. As used herein and in the claims, by "aliphatic polyol" is meant a linear, branched or cyclic polyol that is substantially free of aromatic rings. Examples of aliphatic polyols include, ethylene glycol and cyclohexanediol. The term "aromatic polyol" as used herein and in the claims, refers to polyols that contain aromatic rings, e.g., 4,4'-isopropylidenediphenol. As further used herein and in the claims, by "polyol" is meant a material having two or more hydroxy groups.

The second allyl functional monomer is present in the composition of the present invention in an amount at least sufficient such that a polymerizate of the composition has reduced cracking defects relative to a comparative composition that is free of the second allyl functional monomer. Polymerizates prepared from aromatic polyol bis(allyl carbonate) monomers commonly have higher refractive index values than those of polymerizates prepared from aliphatic polyol bis(allyl carbonate) monomers, as is known to the skilled artisan. For example, polymerizates of 4,4'-isopropylidenediphenol bis(allyl carbonate) typically have a refractive index of 1.56, while the refractive index of polymerizates prepared from diethylene glycol bis(allyl carbonate) are typically 1.498. Polymerizates prepared from compositions of the present invention have refractive index values of less than 1.530, e.g., from 1.498 to 1.529, more usually from 1.500 to 1.520.

The second allyl functional monomer is typically present in the composition of the present invention in an amount of at least 1 percent by weight, preferably at least 3 percent by weight, and more preferably at least 5 percent by weight, based on the total monomer weight of the composition. Typically, the second allyl functional monomer is present in the composition of the present invention in a minor amount, i.e., an amount of less than 49 percent by weight, preferably less than 20 percent by weight, and more preferably less than 15 percent by weight, based on the total monomer weight of the composition. The amount of second allyl functional monomer present in the compositions of the present invention may range between any combination of these values, inclusive of the recited values.

The first and second allyl functional monomers of the composition of the present invention may be prepared by procedures well known in the art, e.g., as described in U.S. Pat. Nos. 2,370,567 and 2,403,113. For example, an aliphatic polyol, e.g., ethylene glycol, can be reacted with phosgene at temperatures typically between 0° C. and 200° C. to form the corresponding polychloroformate, e.g., ethylene dichloroformate. The polychloroformate is then reacted with a substituted or unsubstituted allyl alcohol in the presence of a suitable acid acceptor, e.g., a tertiary amine. Alternatively, an allyl or substituted allyl chloroformate (formed from the reaction of allyl or substituted allyl alcohol with phosgene) is reacted with the polyol in the presence of an acid acceptor.

With reference to general formulae I and II, $R_2$ and $R_4$ are each independently an allyl group which may be substituted at the 2-position with a halogen, most notably chlorine or bromine, or an alkyl group containing from 1 to 4, e.g., 1 to 2, carbon atoms. Generally, the alkyl substituent is methyl or ethyl. In general formulae I and II, $R_2$ and $R_4$ may each be represented independently by the following general formula III:

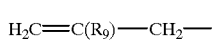

III wherein $R_9$ is hydrogen, halogen or a $C_1$ to $C_4$ alkyl group. Most commonly, $R_9$ is hydrogen and consequently $R_2$ and $R_4$ are each the unsubstituted allyl group, $H_2C=CH-CH_2-$.

The second allyl functional monomer of the composition of the present invention can be described as an aromatic polyol(allyl carbonate) monomer. With reference to general formula II, the aromatic polyol of which $R_3$ is a polyvalent residue, contains 2, 3, 4, 5 or 6 hydroxy groups, and at least one aromatic ring. The hydroxy groups of the aromatic polyol may be bonded directly to the aromatic ring, e.g., as with benzene-1,2-diol, or may be linked to the aromatic ring by linking groups, e.g., as with 1,2-benzenedimethanol. Aromatic polyols of which $R_3$ is a residue may be selected from, for example: benzene diol, e.g., 1,2-dihydroxy benzene and 1,3-dihydroxy benzene; $C_1-C_4$ alkyl substituted benzene diol, e.g., 4-tert-butyl-benzene-1,2-diol, 4-methyl-benzene-1,2-diol, 3-tert-butyl-5-methyl-benzene-1,2-diol and 3,4,5,6-tetramethyl-benzene-1,2-diol; halo substituted benzene diol, e.g., 3,5-dichlorobenzene-1,2-diol, 3,4,5,6-tetrabromo-benzene-1,2-diol and 3,4,5-trichloro-benzene-1,2-diol; and $C_1-C_4$ alkyl and halo substituted benzene diol, e.g., 3-bromo-5-tert-butyl-benzene-1,2-diol, 3,6-dichloro-4-methyl-benzene-1,2-diol, 3, -bromo-4,5-dimethyl-benzene-1,2-diol and 3-chloro-4,6-di-tert-butyl-benzene-1,2-diol. Examples of aromatic polyols having more than two hydroxy groups of which $R_3$ may be a residue, include, but are not limited to, 3,4,3', 4'-tetrabromo-5,5'-methylendibrenzcatechin and 1,2,4-benzenetriol.

The aromatic polyol of which $R_3$ of general formula II is a residue, may also be selected from those represented by the following general formula IV,

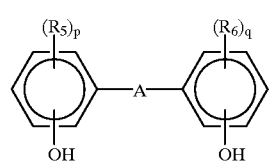

IV in which $R_5$ and $R_6$ are each $C_1-C_4$ alkyl, chlorine or bromine, p and q are each an integer from 0 to 4, and A is O,S, $-S(O_2)-$, $-C(O)-$, $-CH_2-$, $-CH=CH-$, $-C(CH_3)_2-$, $-C(CH_3)(C_6H_5)-$ or

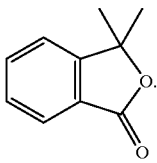

In an embodiment of the present invention, the aromatic polyol of which $R_3$ is a residue is selected from those represented by general formula IV, in which p and q are each 0 and A is —C(CH$_3$)$_2$—. A preferred aromatic polyol in the present invention is 4,4'-isopropylidenediphenol and its corresponding residue, isopropylidene bis(para-phenyl), may be represented by the following general formula V.

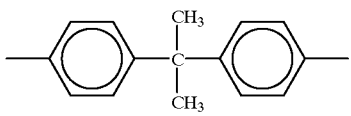

V

With reference to general formula II, examples of residues of aromatic diols from which $R_3$ may be selected include, but are not limited to, 1,2-phenylene, 1,3-phenylene, 4-tert-butyl-1,2-phenylene, 4-methyl-1,2-phenylene, 3,5-dichloro-1,2-phenylene, 3,4,5,6-tetrabromo-1,2-phenylene, 3,4,5-trichloro-1,2-phenylene, 3-bromo-5-tert-butyl-1,2-phenylene and 3-bromo-4,5-dimethyl-1,2-phenylene. Examples of residues of aromatic diols described with reference to general formula IV, from which $R_3$ may be selected include, but are not limited to, di(para-phenyl) ether, di(para-phenyl) thioether, methylene bis(para-phenyl), ethenylene bis(para-phenyl), isopropylidene bis (para-phenyl) and brominated isopropylidene bis(para-phenyl) having from 4 to 8 bromo groups.

Specific examples of aromatic polyol(allyl carbonate) monomers that may be used in the present invention include, but are not limited to, 1,2-dihydroxy benzene bis(allyl carbonate), 1,3-dihydroxy benzene bis(allyl carbonate), 4,4'-oxy-bisphenol bis(allyl carbonate), 4,4'-sulfanediyl-bisphenol bis(allyl carbonate), 4,4'-sulfonyl-bisphenol bis(allyl carbonate), 4,4'-dihydroxy-benzophenone bis(allyl carbonate), 4,4'-methanediyl-bisphenol bis(allyl carbonate), 4,4'-dihydroxy-stilbene bis(allyl carbonate), 4,4'-isopropylidenediphenol bis(allyl carbonate), brominated 4,4'-isopropylidenediphenol bis(allyl carbonate) having from 4 to 8 bromo groups, 1,1-bis(4-hydroxyphenyl)-1-phenyl-ethane bis(allyl carbonate), and 3,3-bis(4-hydroxypheynyl)-3H-isobenzofuran-1-one bis(allyl carbonate). A preferred aromatic polyol bis(allyl carbonate) in the present invention is 4,4'-isopropylidenediphenol bis (allyl carbonate).

The first allyl functional monomer of the composition of the present invention can be described as an aliphatic polyol(allyl carbonate) monomer. With reference to general formula I, the aliphatic polyol of which $R_1$ is a polyvalent residue, contains 2, 3, 4, 5 or 6 hydroxy groups, and may be linear, branched or cyclic. Examples of cycloaliphatic polyols of which $R_1$ may be a residue include, but are not limited to, 1,2-, 1,3- and 1,4-dihydroxy cyclohexane. Examples of aliphatic polyols having more than two hydroxy groups of which $R_1$ may be a residue include, but are not limited to, trimethylol propane, trimethylol ethane, di-trimethylol propane, di-trimethylol ethane, pentaerythritol and di-pentaerythritol.

Typically, the aliphatic polyol of which $R_1$ is a residue, contains 2 hydroxy groups, i.e., a glycol, in which case $R_1$ is more specifically a divalent residue. Commonly, the aliphatic polyol is an alkylene glycol having from 2 to 10 carbons atoms, e.g., ethylene glycol, trimethylene glycol, methylethylene glycol, ethylethylene glycol, pentamethylene glycol, hexamethylene glycol, 2-methylehexamethylene glycol, octamethylene glycol and decamethylene glycol. More typically, the aliphatic polyol is selected from poly ($C_2$<$C_4$)alkylene glycols, examples of which include, diethylene glycol, triethylene glycol, tetraethylene glycol, dipropylene glycol and dibutylene glycol.

With reference to general formula I, examples of divalent residues of cycloaliphatic diols from which $R_1$ may be selected include, but are not limited to, 1,2-, 1,3- and 1,4-cyclohexylene. Examples of residues of aliphatic alcohols having more than two hydroxy groups from which $R_1$ may be selected, include, but are not limited to, 1,1,1-trimethylene propane, i.e., $CH_3CH_2C(CH_2-)_3$, 1,1,1-trimethylene ethane, i.e., $CH_3C(CH_2-)_3$, tetramethylene methane, i.e., $C(CH_2-)_4$, di (2,2-dimethylene butyl) ether, i.e., $O-(CH_2C(CH_2-)_2CH_2CH_3)_2$, di (2,2-dimethylene propyl) ether, i.e., $O-(CH_2C(CH_2-)_2CH_3)_2$, and di(trimethylene methyl) ether, i.e., $O-(C(CH_2-)_3)_2$. Examples of residues of alkylene glycols having from 2 to 10 carbons atoms from which $R_1$ may be selected, include, but are not limited to, ethylene, n-propylene, iso-propylene, 1,2-butylene, n-pentamethylene, n-hexamethylene, 2-methyl-1,6-hexamethylene, n-octamethylene and n-decamethylene. Residues of poly ($C_2$–$C_4$)alkylene glycols from which $R_1$ may be selected include, for example, —CH$_2$CH$_2$—O—CH$_2$CH$_2$—, —CH$_2$CH$_2$—O—CH$_2$CH$_2$—O—CH$_2$CH$_2$—, —CH$_2$CH$_2$CH$_2$—O—CH$_2$CH$_2$CH$_2$—and—CH$_2$CH$_2$CH$_2$CH$_2$—O—CH$_2$CH$_2$CH$_2$CH$_2$—. In a preferred embodiment of the present invention, R1 is a residue of diethylene glycol, i.e., —CH$_2$CH$_2$—O—CH$_2$CH$_2$—. In general formula I, $R_1$ may also be selected from alkylene carbonate groups, e.g., —CH$_2$CH$_2$—O—C(O)—O—CH$_2$CH$_2$—, and alkylene ether carbonate groups, e.g., —CH$_2$CH$_2$—O—CH$_2$CH$_2$—O—C(O)—O—CH$_2$CH$_2$—O—CH$_2$CH$_2$—.

Specific examples of aliphatic polyol(allyl carbonate) monomers that may be used in the present invention include, but are not limited to, ethylene glycol bis(2-chloroallyl carbonate), ethylene glycol bis(allyl carbonate), diethylene glycol bis(2-methylallyl carbonate), diethylene glycol bis (allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis(allyl carbonate), trimethylene glycol bis(2-ethylallyl carbonate), pentamethylene glycol bis(allyl carbonate), 1,4-cyclohexanediol bis(allyl carbonate), 4,4'-isopropylidenebiscyclohexanol bis(allyl carbonate) and combinations thereof. A preferred aliphatic polyol(allyl carbonate) monomer is diethylene glycol bis(allyl carbonate).

The first allyl functional monomer represented by general formula I is typically present in the composition of the present invention in a major amount, i.e., an amount of at least 51 percent by weight, preferably at least 80 percent by weight, and more preferably at least 85 percent by weight, based on the total monomer weight of the composition of the present invention. Typically, the first allyl functional monomer is present in the composition in an amount of less than 99 percent by weight, preferably less than 97 percent by weight, and more preferably less than 95 percent by weight, based on the total monomer weight of the composition of the present invention. The amount of first allyl functional monomer present in the compositions of the present invention may range between any combination of these values, inclusive of the recited values.

As used in the present description with reference to the radically polymerizable monomers represented by general formulas I and II, the terms aliphatic polyol(allyl carbonate) monomer and aromatic polyol(allyl carbonate) or like names, e.g., diethylene glycol bis(allyl carbonate) and 4,4'-isopropylidenediphenol bis(allyl carbonate), are intended to mean and include the named monomers or prepolymers thereof and any related monomer or oligomer species contained therein.

The polymerizable compositions of the present invention may optionally contain other radically copolymerizable materials in minor amounts (e.g., up to 5, 10, 15, 20 or 25 percent by weight, based on the total monomer weight of the composition). Copolymerizable materials having a single ethylenically unsaturated radically polymerizable group that may be present in the composition of the present invention include, but are not limited to, (meth)acrylates, such as methyl (meth)acrylate, phenyl (meth)acrylate, 2-hydroxyethyl (meth)acrylate and 2-ethylhexyl (meth) acrylate, allyl alcohol and vinyl chloride. Copolymerizable materials having two radically polymerizable groups, that may be used in the present invention, include, but are not limited to, ethylene glycol bis(meth)acrylate, poly(ethylene glycol) bis(meth)acrylates, 4,4'-isopropylidenediphenol bis (meth)acrylate, and alkoxylated 4,4'-isopropylidenediphenol bis(meth)acrylate (e.g., having a total of 2 to 70, 10 to 20 or 20 to 40 ethoxy units). Examples of copolymerizable materials having more than two radically polymerizable groups, that may be used in the present invention, include, but are not limited to, trimethylolpropane tris(meth)acrylate, alkoxylated trimethylolpropane tris(meth)acrylate, pentaerythritol tri- and tetra-(meth)acrylate, and triallyl isocyanurate. As used herein by "(meth)acrylate" and similar terms is meant acrylates, methacrylates and mixtures of acrylates and methacrylates.

Polymerization of the polymerizable organic composition of the present invention may be accomplished by adding to the composition an initiating amount of material capable of generating free radicals, such as organic peroxy compounds, i.e., an initiator. Methods for polymerizing polyol(allyl carbonate) compositions are well known to the skilled artisan and any of those well known techniques may be used to polymerize the aforedescribed polymerizable organic compositions.

Suitable examples of organic peroxy compounds, that may be used as initiators include: peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate.

In an embodiment of the present invention, the initiator is a monoperoxycarbonate initiator represented by the following general formula VI,

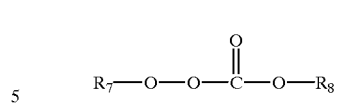

VI wherein $R_7$ is a tertiary $C_4$–$C_5$ alkyl, e.g., tertiary-butyl and tertiary-amyl, and $R_8$ is a $C_3$–$C_7$ alkyl, e.g., n-propyl, isopropyl, n-butyl, isobutyl, tertiary-butyl, pentyl, hexyl and heptyl. Preferably $R_7$ is tertiary-butyl, and $R_8$ is isopropyl.

When the composition of the present invention also contains static dyes and/or photochromic substances (as discussed further herein), it is preferred that monoperoxycarbonate initiators according to general formula VI be used in the preparation of polymerizates from such compositions. While not intending to be bound by any theory, it is believed that monoperoxycarbonate initiators are less aggressive towards and are less likely to destroy or otherwise deactivate static dyes and/or photochromic substances that are present during the polymerization process than more aggressive initiators.

The amount of initiator used to initiate and polymerize the polymerizable compositions of the present invention may vary and will depend on the particular initiator used. Only that amount that is required to initiate and sustain the polymerization reaction is required, i.e., an initiating amount. With respect to monoperoxycarbonate initiators, as represented by general formula VI, typically from 0.40 to 1.50 parts of initiator per 100 parts of the monomer (phm) may be used. More usually, from 0.50 to 1.25 phm is used to initiate the polymerization. The amount of initiator and the consequent cure cycle should be adequate to produce a polymerizate having a 15 second Barcol hardness of at least 1, preferably, at least 4, and more preferably, at least 20. Typically, as is known to the skilled artisan, the cure cycle involves heating the polymerizable organic composition in the presence of the initiator from room temperature to an elevated temperature of between 85° C. and 125° C. over a period of from 15 hours to 30 hours.

Various conventional additives may be incorporated into the polymerizable organic composition of the present invention. Such additives may include light stabilizers, heat stabilizers, ultraviolet light absorbers, mold release agents, pigments and flexibilizing additives that are not radically polymerizable, e.g., alkoxylated phenol benzoates and poly (alkylene glycol) dibenzoates. Such additives are typically present in the compositions of the present invention in amounts totaling less than 10 percent by weight, preferably less than 5 percent by weight, and more preferably less than 3 percent by weight, based on the total weight of the polymerizable composition.

Polymerizable compositions according to the present invention may optionally contain a colorant selected from static dyes, photochromic substances and mixtures thereof. As used herein and in the claims, the term "static dyes" and similar terms refer to dyes that are substantially free of color change upon exposure to ultraviolet light, i.e. non-photochromic dyes.

Classes of dyes that may be present in the composition of the present invention, include, but are not limited to, azo dyes, anthraquinone dyes, xanthene dyes, azime dyes and mixtures thereof. The dyes may be in form of a liquid or a powder, preferably a powder. When used in powder form, a concentrate of the powdered dye and monomer, e.g., the first and/or second allyl functional monomers, is typically prepared. The dye/monomer concentrate is then mixed with additional monomer(s) to prepare compositions according to the present invention. A preferred class of dyes are the anthraquinone dyes. Examples of antraquinone dyes that may be present in the composition of the present invention, include but are not limited to, 1,4-dihydroxy-9,10-antracenedione (CAS registry No. 81-64-1), 1,4-bis(4-methylphenyl)amino-9,10-anthracendione (CAS registry No. 128-80-3), 1,4-bis((2-bromo-4,6-dimethylphenyl) amino)-9,10-anthracenedione (CAS registry No. 18038-98-8), and mixtures thereof.

When used in the compositions of the present invention, static dyes or combinations of static dyes are typically present in amounts sufficient to provide a desired color and percent transmittance of visible light in polymerizates prepared therefrom (e.g., 15 percent transmittance as determined in accordance with American Standard Test Method No. D 1003-95, using an appropriate instrument, such as a HunterLab model ColorQuest II spectrophotometer). The exact level of static dye used will depend on type of static dye(s) used, and the desired color and percent transmittance. Typically, static dyes may be present in compositions according to the present invention in amounts of from 100 parts per million parts of composition (ppm) to 800 ppm, e.g., from 150 ppm to 500 ppm.

When the compositions of the present invention contain photochromic substances, polymerizates prepared therefrom, e.g., lenses, should be transparent to that portion of the electromagnetic spectrum which activates the photochromic substance(s). That portion of the electromagnetic spectrum that is of particular interest is that wavelength of ultraviolet (UV) light that produces the colored or open form of the photochromic substance and that portion of the visible spectrum that includes the absorption maximum wavelength of the photochromic substance in its UV activated form, i.e., the open form. Photochromic substances that may be present in the compositions of the present invention include organic photochromic substances, inorganic photochromic substances and mixtures thereof. Preferably, the photochromic substance is one or more organic photochromic substances or compounds. The compositions of the present invention may comprise organic photochromic substances selected from spiro(indoline)naphthoxazines, spiro(indoline) benzoxazines, benzopyrans, naphthopyrans, organo-metal dithizonates, fulgides, fulgimides and mixtures thereof.

A first group of organic photochromic substances contemplated for use in the compositions of the present invention are those having an activated absorption maximum within the visible range of greater than 590 nanometers, e.g., between greater than 590 to 700 nanometers. These materials typically exhibit a blue, bluish-green, or bluish-purple color when exposed to ultraviolet light in an appropriate solvent or matrix. Examples of classes of such substances that are useful in the present invention include, but are not limited to, spiro(indoline)naphthoxazines and spiro (indoline)benzoxazines. These and other classes of such photochromic substances are described in the open literature. See for example, U.S. Pat. Nos. 3,562,172; 3,578,602; 4,215,010; 4,342,668; 5,405,958; 4,637,698; 4,931,219; 4,816,584; 4,880,667; 4,818,096. Also see for example: Japanese Patent Publication 62/195383; and the text, *Techniques in Chemistry*, Volume III, "Photochromism," Chapter 3, Glenn H. Brown, Editor, John Wiley and Sons, Inc., New York, 1971.

A second group of organic photochromic substances contemplated for use in the compositions of the present invention are those having at least one absorption maximum and preferably two absorption maxima, within the visible range of between 400 and less than 500 nanometers. These materials typically exhibit a yellow-orange color when exposed to ultraviolet light in an appropriate solvent or matrix. Such compounds include certain chromenes, i.e., benzopyrans and naphthopyrans. Many of such chromenes are described in the open literature, e.g., U.S. Pat. Nos. 3,567,605; 4,826,977; 5,066,818; 4,826,977; 5,066,818; 5,466,398; 5,384,077; 5,238,931; and 5,274,132.

A third group of organic photochromic substances contemplated for use in the compositions of the present invention are those having an absorption maximum within the visible range of between 400 to 500 nanometers and another absorption maximum within the visible range of between 500 to 700 nanometers. These materials typically exhibit color(s) ranging from yellow/brown to purple/gray when exposed to ultraviolet light in an appropriate solvent or matrix. Examples of these substances include certain benzopyran compounds, having substituents at the 2-position of the pyran ring and a substituted or unsubstituted heterocyclic ring, such as a benzothieno or benzofurano ring fused to the benzene portion of the benzopyran. Such materials are the subject of U.S. Pat. No. 5,429,774.

other photochromic substances contemplated are photochromic organo-metal dithizonates, i.e., (arylazo)-thioformic arylhydrazidates, e.g., mercury dithizonates, which are described in, for example, U.S. Pat. No. 3,361,706. Fulgides and fulgimides, e.g. the 3-furyl and 3-thienyl fulgides and fulgimides, are described in U.S. Pat. No. 4,931,220 at column 20, line 5 through column 21, line 38.

Additional photochromic substances that are also useful in the present invention include photochromic pigments and organic photochromic substances encapsulated in metal oxides, the latter of which are described in U.S. Pat. No. 4,166,043 and 4,367,170. Organic photochromic substances sufficiently encapsulated within a matrix of an organic polymerizate, as described in U.S. Pat. No. 4,931,220, may also be present in the polymerizable compositions of the present invention.

The disclosures relating to such photochromic substances in the aforedescribed patents are incorporated herein, in toto, by reference. The compositions of the present invention may contain one photochromic substance or a mixture of photochromic substances, as desired. Mixtures of photochromic substances may be used to attain certain activated colors such as a near neutral gray or brown.

Each of the photochromic substances described herein may be present in the compositions of the present invention in amounts and in a ratio (when mixtures are used) such that polymerizates prepared therefrom exhibit a desired resultant color, e.g., a substantially neutral color such as shades of gray or brown when activated with unfiltered sunlight, i.e., as near a neutral color as possible given the colors of the activated photochromic substances. The relative amounts of the aforesaid photochromic substances used will vary and depend in part upon the relative intensities of the color of the activated species of such compounds, and the ultimate color desired.

Polymerizates obtained from polymerization of polymerizable compositions of the present invention will be solid, and preferably transparent, e.g., suitable for optical or ophthalmic applications. Solid articles that may be prepared from polymerizable organic compositions of the present invention include, but are not limited to, optical lenses, such as plano and ophthalmic lenses, sun lenses, windows, automotive transparencies, e.g., windshields, sidelights and backlights, and aircraft transparencies, etc.

The present invention is more particularly described in the following examples, which are intended to be illustrative only, since numerous modifications and variations therein will be apparent to those skilled in the art. Unless otherwise specified, all parts and percentages are by weight.

Casting Compositions

Casting compositions were prepared from the ingredients listed in Table 1. Casting composition A is a comparative composition, while casting composition B is a composition according to the present invention.

TABLE 1

|  | A | B |
|---|---|---|
| Aliphatic polyol bis (allyl carbonate) monomer (a) | 100 | 90 |
| Aromatic polyol bis (allyl carbonate) monomer (b) | 0 | 10 |
| BPIC (c) | 0.6 | 0.6 |
| Mold release agent (ppm) (d) | 5 | 3 |

(a) HIGH ADC CR-39 ® monomer, CAS No. 142-22-3, diethylene glycol bis (allyl carbonate) monomer available commercially from PPG Industries, Inc.
(b) HIRI ® CASTING RESIN, CAS No. 084000-75-9, Bisphenol A bis (allyl carbonate) monomer available commercially from PPG Industries, Inc.
(c) tert-butylperoxy isopropyl carbonate initiator.
(d) ZELEC ® UN Lubricant, a mixture of $C_8$–$C_{16}$ alkyl esters of phosphoric acid available commercially from Du Pont Chemicals. Amount shown is in units of parts of mold release agent per million parts of composition (ppm).

Cast Lens Examples

Casting compositions A and B were each mixed at room temperature and injected separately into glass molds used to prepare circular plano lenses having front and rear dioptor values of 6.0, and an outer rim diameter of 65 mm. The glass molds were fitted with polyvinylchloride gaskets. Ten (10) lens molds were filled and their contents polymerized using the cure cycle summarized in Table 2. At the completion of the cure cycle the lenses were removed from the molds and evaluated visually for the occurrence of cracking. The results of the cracking evaluation are summarized in Table 3. The refractive index of polymerizates prepared from casting composition A is 1.499, and 1.506 for polymerizates prepared from casting composition B.

TABLE 2*

| Cure Cycle | |
|---|---|
| Time (hours) | Temperature (° C.) |
| 0 | 98 |
| 5 | 102 |
| 8 | 107 |
| 15 | 107 |
| 16 | 103 |
| 19(e) | 70 |

*The temperature changes in Table 2 were all substantially linear.
(e) At the completion of the nineteenth hour, the molds were removed from the oven and the lenses demolded.

TABLE 3

| | Lens Cracking | |
|---|---|---|
| Casting composition | Number of Lenses molded. | Number of lenses observed to have cracks. (f) |
| A | 10 | 10 |
| B | 10 | 2 |

(f) The lenses were evaluated visually for cracks after they had been demolded.

the data summarized in Table 3 shows that polymerizates prepared from compositions according to the present invention, i.e., casting composition B, have a reduced occurrence of cracking defects relative to polymerizates prepared from a comparative composition, i.e., casting composition A. Tinted polymerizates having a percent transmittance of 15 percent (as determined in accordance with ASTM No. D 1003-95, using a HunterLab model ColorQuest II spectrophotometer) were successfully prepared in a one step process from a polymerizable composition similar to polymerizable composition B that further contained 250 ppm of 1,4-bis(4-methylphenyl)amino-9,10-anthracendione (CAS No. 128-80-3) dark green tint. The one step process involved polymerizing the tinted polymerizable composition using the cure cycle as summarized in Table 2.

The present invention has been described with reference to specific details of particular embodiments thereof. It is not intended that such details be regarded as limitations upon the scope of the invention except insofar as and to the extent that they are included in the accompanying claims.

We claim:
1. A polymerizable composition comprising:
  (a) a major amount of a first allyl functional monomer represented by the following general formula,

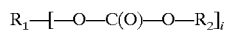

in which $R_1$ is a polyvalent residue of an aliphatic polyol, $R_2$ is an allyl group or a substituted allyl group, and i is a whole number from 2 to 6; and (b) a minor amount of a second allyl functional monomer represented by the following general formula,

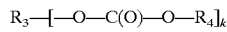

in which $R_3$ is a polyvalent residue of an aromatic polyol, $R_4$ is a an allyl group or a substituted allyl group, and k is a whole number from 2 to 6, wherein said second allyl functional monomer is present in said polymerizable composition in at least an amount to provide a polymerizate of said polymerizable composition having (i) reduced cracking defects relative to a polymerizate of said composition free of (b), and (ii) a refractive index of less than 1.530.

2. The composition of claim 1 wherein i is 2, and said aliphatic polyol of which $R_1$ is a residue is selected from the group consisting of $C_2$–$C_{10}$ alkylene glycols, poly($C_2$–$C_4$) alkylene glycols and mixtures thereof; k is 2, and said aromatic polyol of which $R_3$ is a residue is selected from the group consisting of benzene diol, $C_1$–$C_4$ alkyl substituted benzene diol, halo substituted benzene diol, $C_1$–$C_4$ alkyl and halo substituted benzene diol, an aromatic polyol represented by the following general formula,

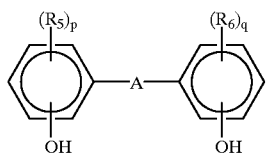

in which $R_5$ and $R_6$ are each $C_1$–$C_4$ alkyl, chlorine or bromine, p and q are each an integer from 0 to 4, and A is O, S, —S($O_2$)—, —C(O)—, —$CH_2$—, —CH═CH—, —C($CH_3$)$_2$—, —C($CH_3$) ($C_6H_5$)—or

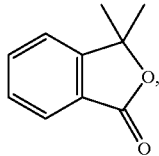

and mixtures of such aromatic polyols.

3. The composition of claim 2 wherein said aliphatic polyol is selected from poly($C_2$–$C_4$)alkylene glycol, p and q are each 0, and A is —C($CH_3$)$_2$—.

4. The composition of claim 1 wherein said first allyl functional monomer (a) is present in an amount of from 51 percent to 99 percent by weight, based on the total monomer weight of said composition, and said second allyl functional monomer (b) is present in an amount of from 1 percent to 49 percent by weight, based on the total monomer weight of said composition.

5. The composition of claim 4 wherein said first allyl functional monomer (a) is present in an amount of from 80 percent to 97 percent by weight, based on the total monomer weight of said composition, and said second allyl functional monomer (b) is present in an amount of from 3 percent to 20 percent by weight, based on the total monomer weight of said composition.

6. The composition of claim 1 further comprising a colorant selected from the group consisting of static dyes, photochromic substances and mixtures thereof.

7. The composition of claim 6 further comprising a polymerization initiator represented by the following general formula,

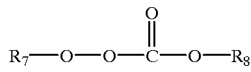

wherein $R_7$ is a tertiary $C_4$–$C_5$ alkyl, and $R_8$ is a $C_3$–$C_7$ alkyl.

8. The composition of claim 6 wherein said photochromic substance is selected from an organic photochromic substance comprising at least one of spiro(indoline) naphthoxazines, spiro(indoline)benzoxazines, benzopyrans, naphthopyrans, organo-metal dithizonates, fulgides and fulgimides.

9. A polymerizable composition comprising:
(a) a major amount of a first allyl functional monomer represented by the following general formula,

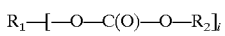

in which $R_1$ is a polyvalent residue of an aliphatic polyol selected from the group consisting of $C_1$–$C_{10}$ alkylene glycols, poly($C_2$–$C_4$)alkylene glycols and mixtures thereof, $R_2$ is an allyl group or a substituted allyl group, and i is 2;

(b) a minor amount of a second allyl functional monomer represented by the following general formula,

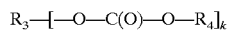

in which $R_3$ is a polyvalent residue of an aromatic polyol selected from the group consisting of benzene diol, $C_1$–$C_4$ alkyl substituted benzene diol, halo substituted benzene diol, $C_1$–$C_4$ alkyl and halo substituted benzene diol, an aromatic polyol represented by the following general formula,

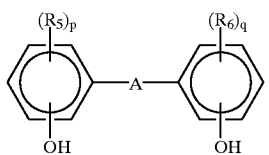

in which $R_5$ and $R_6$ are each $C_1$–$C_4$ alkyl, chlorine or bromine, p and q are each an integer from 0 to 4, and A is O, S, —S($O_2$)—, —C(O)—, —$CH_2$—, —CH═CH—, —C($CH_3$)$_2$—, —C($CH_3$) ($C_6H_5$)—or

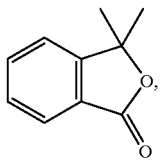

and mixtures of such aromatic polyols, $R_4$ is an allyl group or substituted allyl group, and k is 2; and (c) a colorant selected from static dyes, photochromic substances and mixtures thereof; wherein said second allyl functional monomer is present in said polymerizable composition in at least an amount to provide a polymerizate of said polymerizable composition having (i) reduced cracking defects relative to a polymerizate of said composition free of (b), and (ii) a refractive index of less than 1.530.

10. The composition of claim 9 further comprising a polymerization initiator represented by the following general formula,

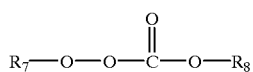

wherein $R_7$ is a tertiary $C_4$–$C_5$ alkyl, and $R_8$ is a $C_3$–$C_7$ alkyl.

11. The composition of claim 10 wherein said polymerization initiator is present in an amount of from 0.40 to 1.50 parts per 100 parts of monomer, $R_7$ is tertiary-butyl, and $R_8$ is isopropyl.

12. The composition of claim 9 wherein said aliphatic polyol is selected from poly ($C_2$–$C_4$) alkylene glycol, and said aromatic polyol is represented by the following general formula,

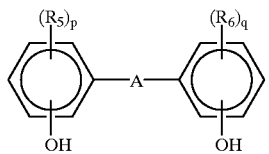

in which p and q are each 0, and A is —C(CH$_3$)$_2$—

13. The composition of claim 12 wherein said photochromic substance is selected from an organic photochromic substance comprising at least one of spiro(indoline) naphthoxazines, spiro(indoline)benzoxazines, benzopyrans, naphthopyrans, organo-metal dithizonates, fulgides and fulgimides.

14. The composition of claim 13 wherein said first allyl functional monomer (a) is present in an amount of from 80 percent to 97 percent, by weight based on the total monomer weight of said composition, and said second allyl functional monomer (b) is present in an amount of from 3 percent to 20 percent, by weight based on the total monomer weight of said composition.

15. The polymerizate of claim 1.

16. The polymerizate of claim 9.

17. The polymerizate of claim 14.

18. A polymerizable composition comprising:
(a) a major amount of diallyl diglycol carbonate; and
(b) a minor amount of diallyl carbonate bisphenol-A, wherein said diallyl carbonate bisphenol-A is present in said polymerizable composition in at least an amount to provide a polymerizate of said polymerizabie composition having (i) reduced cracking defects relative to a polymerizate of said composition free of (b), and (ii) a refractive index of less than 1.530.

19. The composition of claim 18 wherein said allyl diglycol carbonate (a) is present in an amount of from 51 percent to 99 percent by weight, based on the total monomer weight of said composition, and said diallyl carbonate bisphenol-A (b) is present in an amount of from 1 percent to 49 percent by weight, based on the total monomer weight of said composition.

20. The composition of claim 19 wherein said allyl diglycol carbonate (a) is present in an amount of from 80 percent to 97 percent by weight, based on the total monomer weight of said composition, and said diallyl carbonate bisphenol-A (b) is present in an amount of from 3 percent to 20 percent by weight, based on the total monomer weight of said composition.

21. The composition of claim 18 further comprising a colorant selected from the group consisting of static dyes, photochromic substances and mixtures thereof.

22. The composition of claim 21 further comprising a polymerization initiator represented by the following general formula,

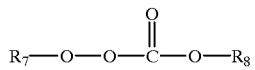

wherein R$_7$ is a tertiary C$_4$–C$_5$ alkyl, and R$_8$ is a C$_3$–C$_7$ alkyl.

23. The composition of claim 21 wherein said photochromic substance is selected from an organic photochromic substance comprising at least one of spiro(indoline) naphthoxazines, spiro(indoline)benzoxazines, benzopyrans, naphthopyrans, organo-metal dithizonates, fulgides and fulgimides.

24. The composition of claim 22 wherein said polymerization initiator is present in an amount of from 0.40 to 1.50 parts per 100 parts of monomer, R$_7$ is tertiary-butyl, and R$_8$ is isopropyl.

* * * * *